US005439073A

United States Patent [19]

Johnson

[11] Patent Number: 5,439,073

[45] Date of Patent: Aug. 8, 1995

[54] FOLDAWAY SPLAY-LEGGED STAND

[76] Inventor: Richard Johnson, P.O. Box 8, Greenbank, Wash. 98253

[21] Appl. No.: 968,776

[22] Filed: Oct. 30, 1992

[51] Int. Cl.$^{6}$ .................................. F16M 11/00

[52] U.S. Cl. .................................. 182/153; 182/186

[58] Field of Search .................................. 182/153–155, 182/181–186, 224–227, 46; 411/509, 510, 913; 294/158; 16/110 R, 114 R, 115, 125

[56] References Cited

U.S. PATENT DOCUMENTS

| | | | |
|---|---|---|---|
| 638,987 | 12/1899 | Porter | 182/153 |
| 1,960,991 | 5/1934 | De Young | 304/6 |
| 2,089,429 | 8/1937 | Rossow | 304/5 |
| 2,506,896 | 5/1950 | Shakowitz | 182/155 |
| 2,832,648 | 4/1958 | Goosmann | 182/155 |
| 2,921,763 | 1/1960 | Miller | 248/188.54 |
| 3,176,326 | 4/1965 | Zysman | 294/153 |
| 3,716,112 | 2/1973 | Lake | 182/155 |
| 3,951,233 | 4/1976 | Meyers | 182/181 X |
| 3,995,716 | 12/1976 | Bond | 182/186 |
| 4,124,093 | 11/1978 | Breisch | 182/181 |
| 4,570,752 | 2/1986 | Chapman et al. | 182/155 |
| 5,207,290 | 5/1993 | Torok | 183/153 |

FOREIGN PATENT DOCUMENTS

| | | | |
|---|---|---|---|
| 2032311 | 6/1970 | Germany | 182/184 |
| 3272308 | 12/1991 | Japan | 411/913 |

*Primary Examiner*—Alvin C. Chin-Shue

*Attorney, Agent, or Firm*—Robert W. Beach

[57] ABSTRACT

The upper end portions of splayed legs are connected by pins that slide lengthwise of slots extending transversely of a crosspiece, the opposite ends of which can be supported by pairs of splayed legs, respectively. Sliding of the pins in their slots enables the ends of the legs to be fitted into sockets in the crosspiece and enables the legs to be withdrawn lengthwise from the crosspiece sockets, then swung together in substantial parallelism, and finally swung about the axis of the pins into overlapping folded relationship nested in angles of the crosspiece which is of T-bar cross section. Tubular extensions can be provided for the legs, and steps connecting the legs at opposite ends of the crosspiece can be attached for enabling a worker to step up onto the crosspiece.

5 Claims, 12 Drawing Sheets

Fig.1
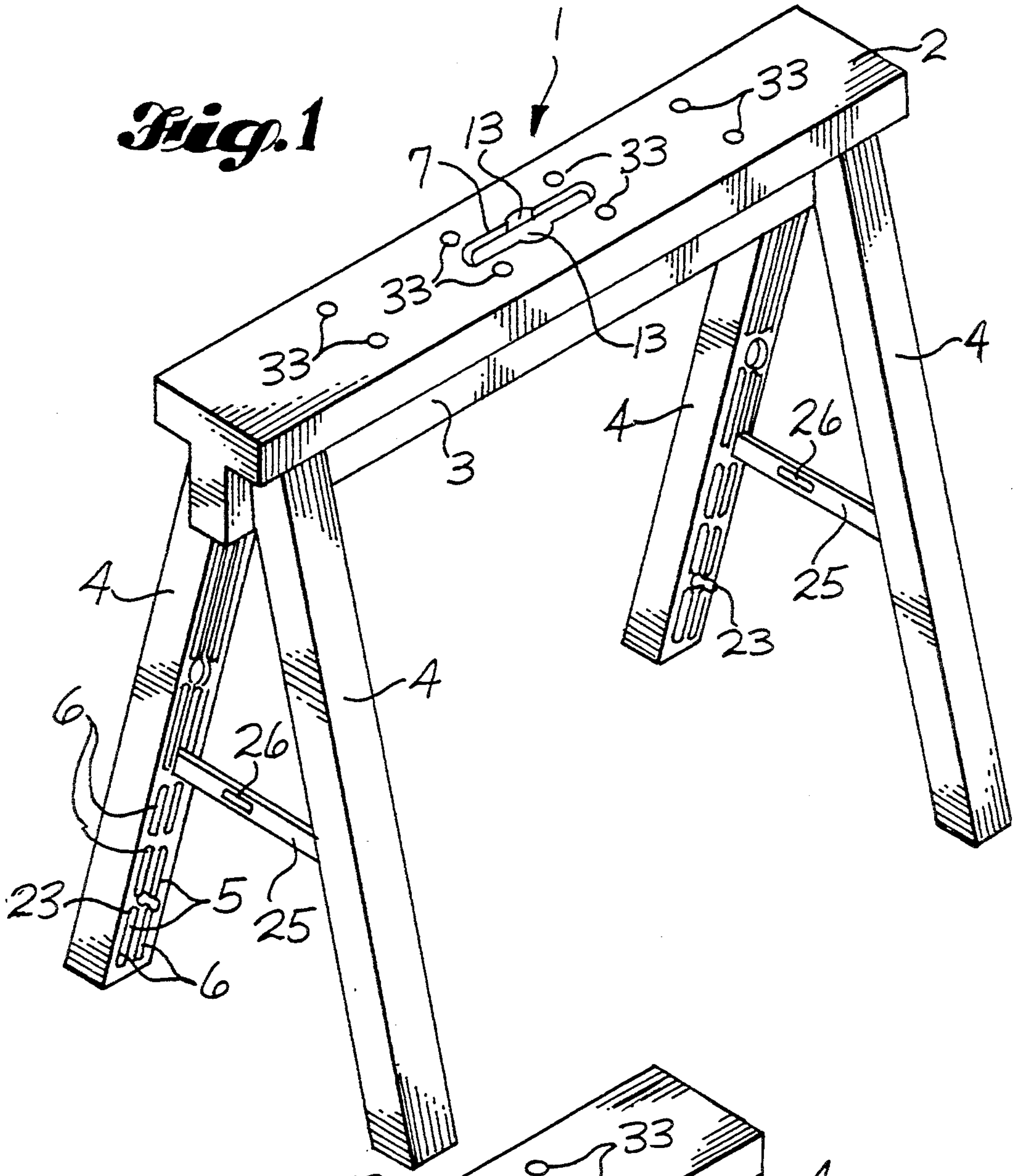
Fig.2
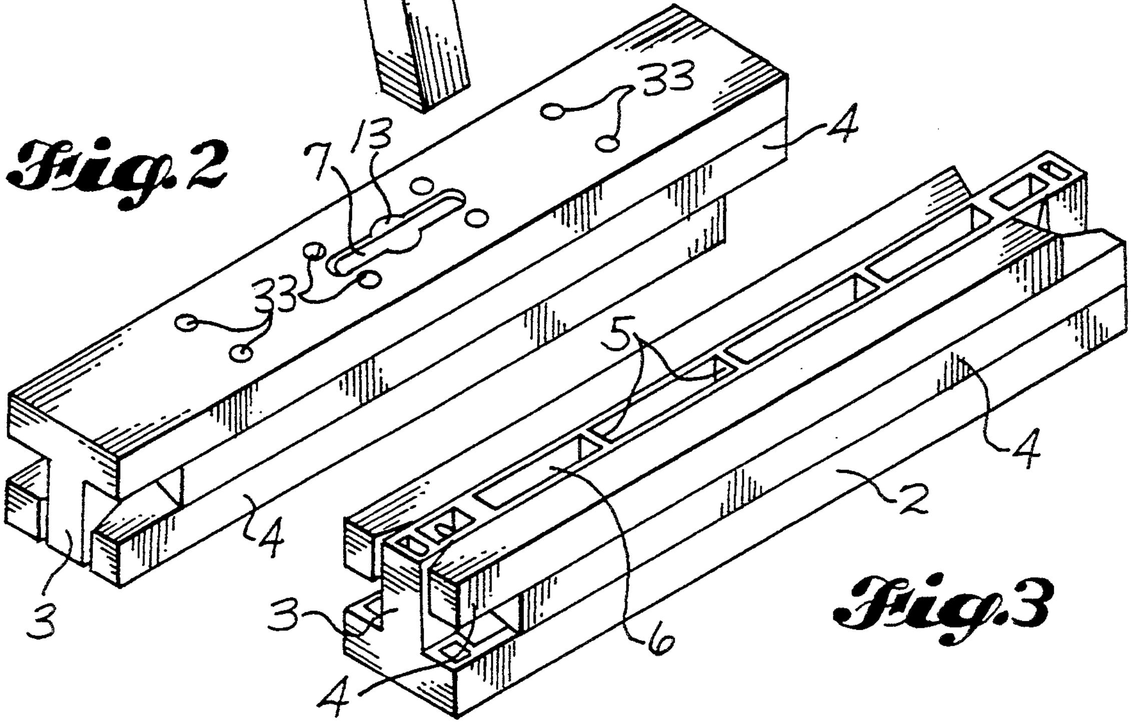
Fig.3

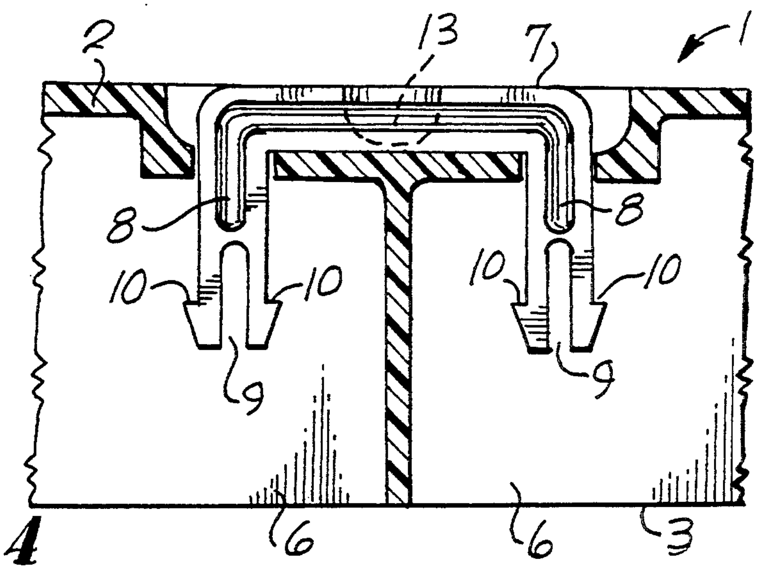
Fig. 4
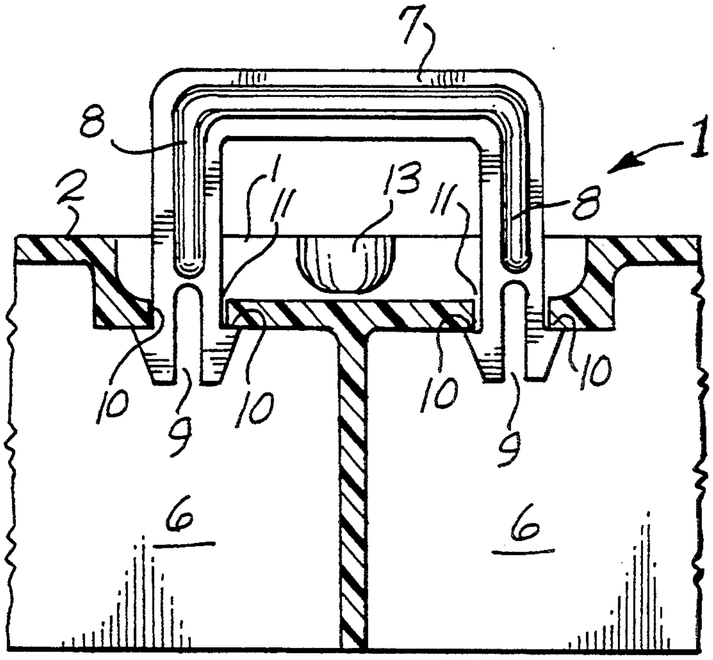
Fig. 5
Fig. 7
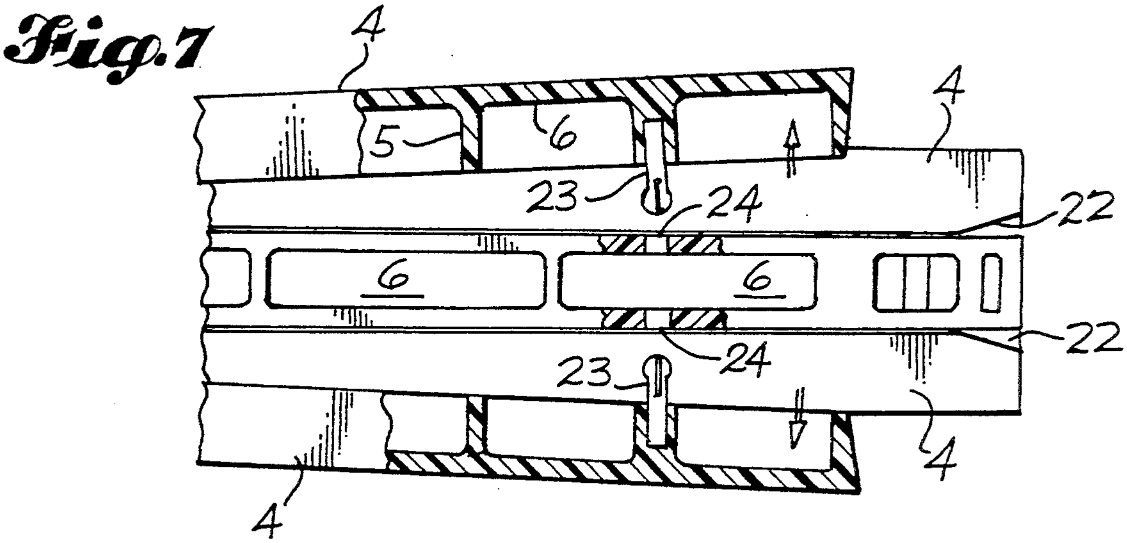

Fig.6
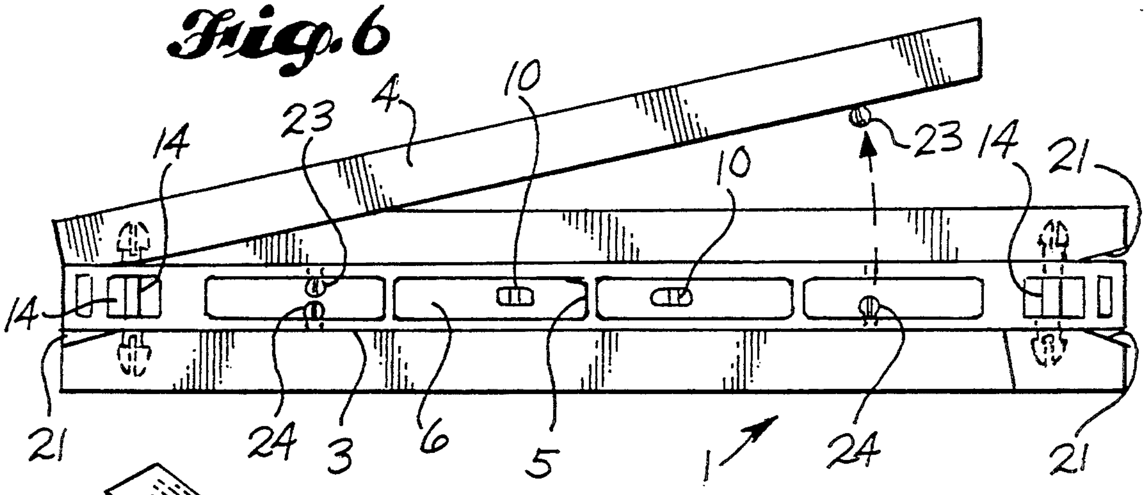
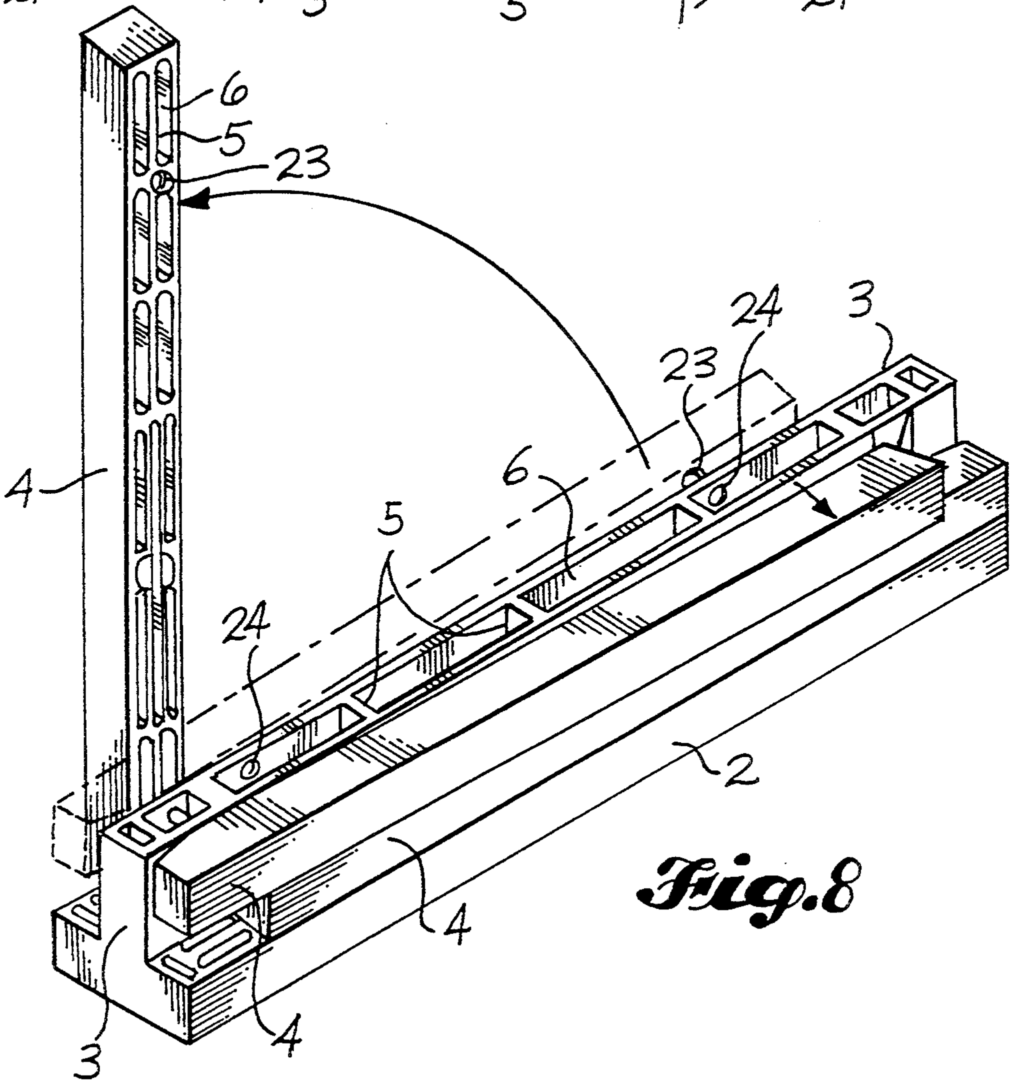
Fig.8

Fig.14
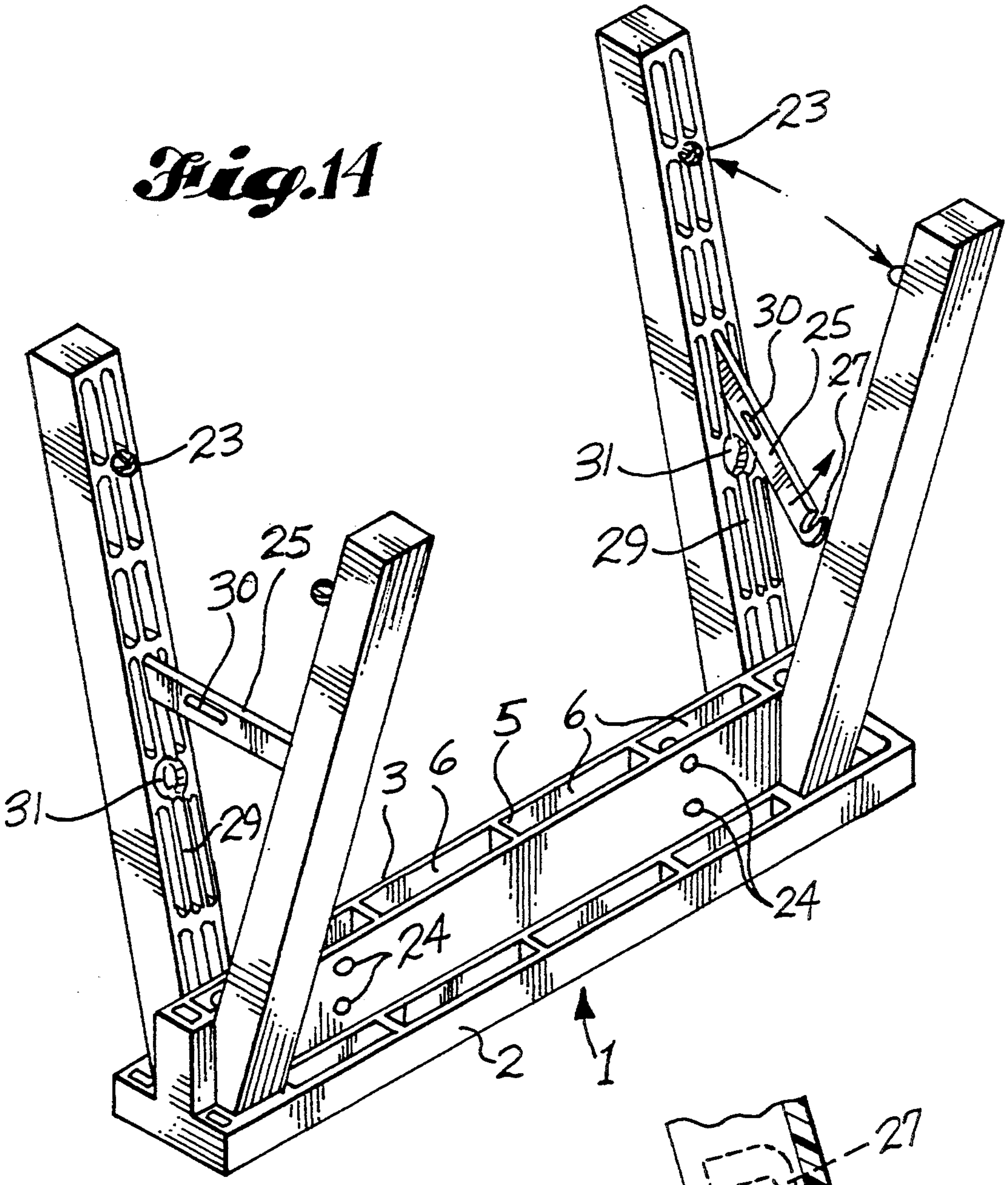
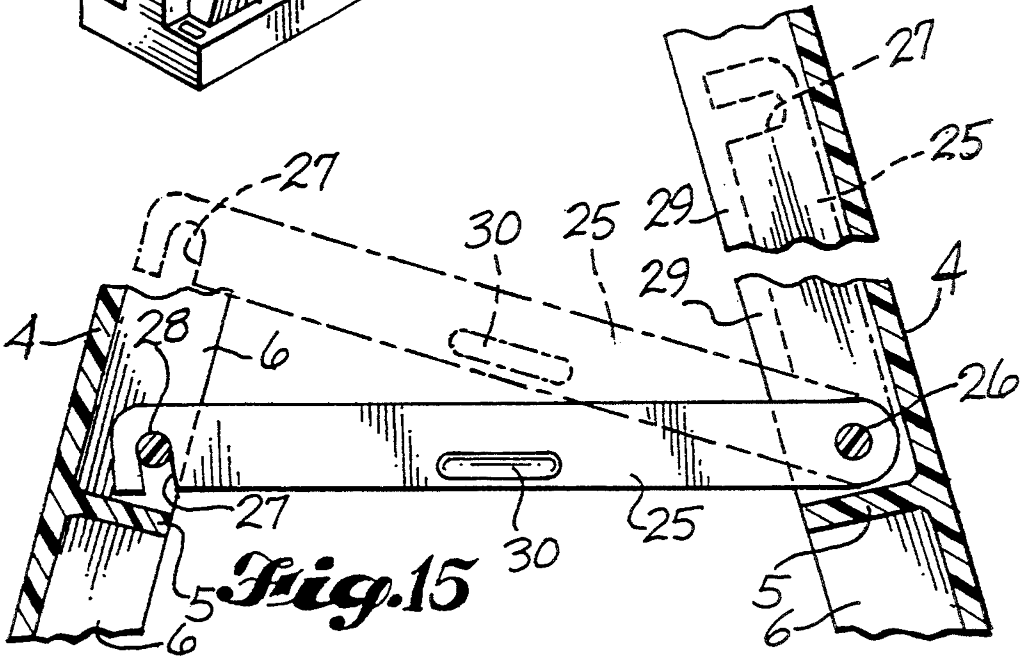
Fig.15

Fig. 16
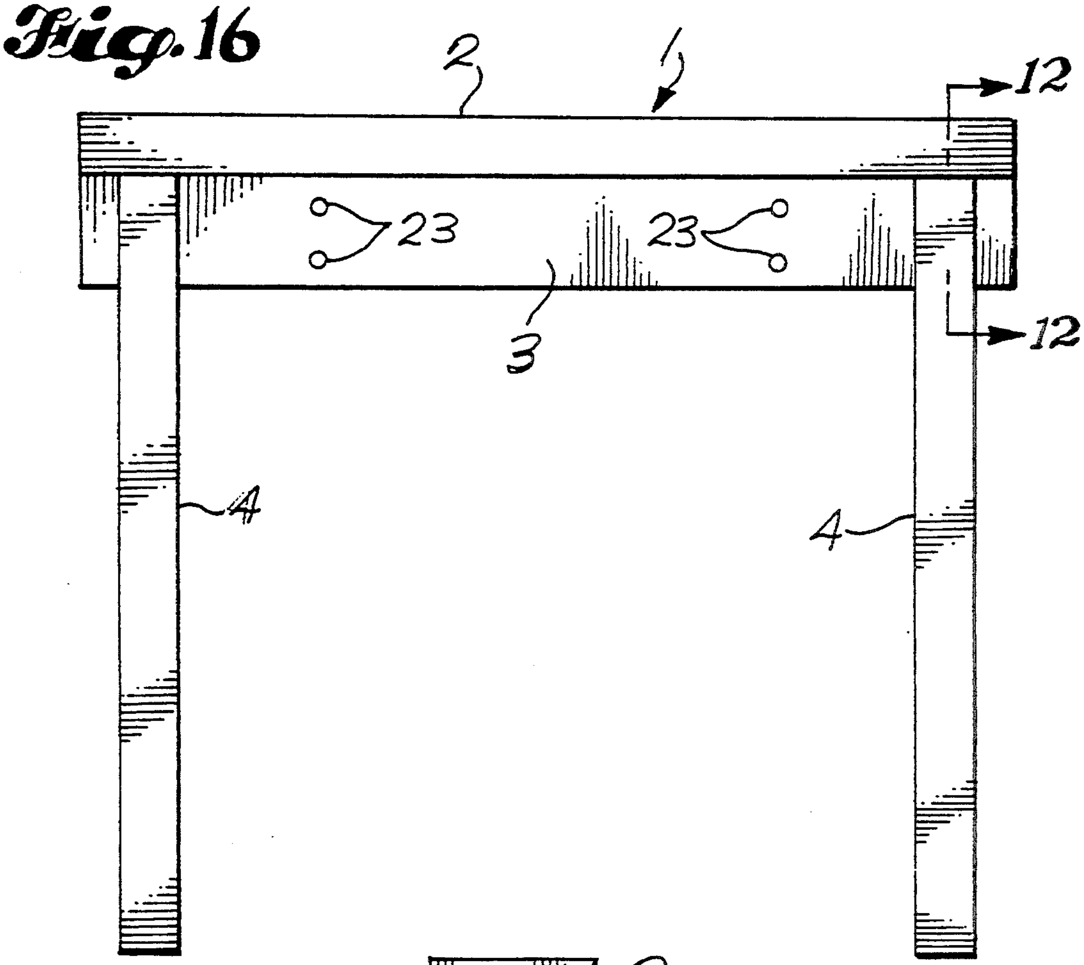
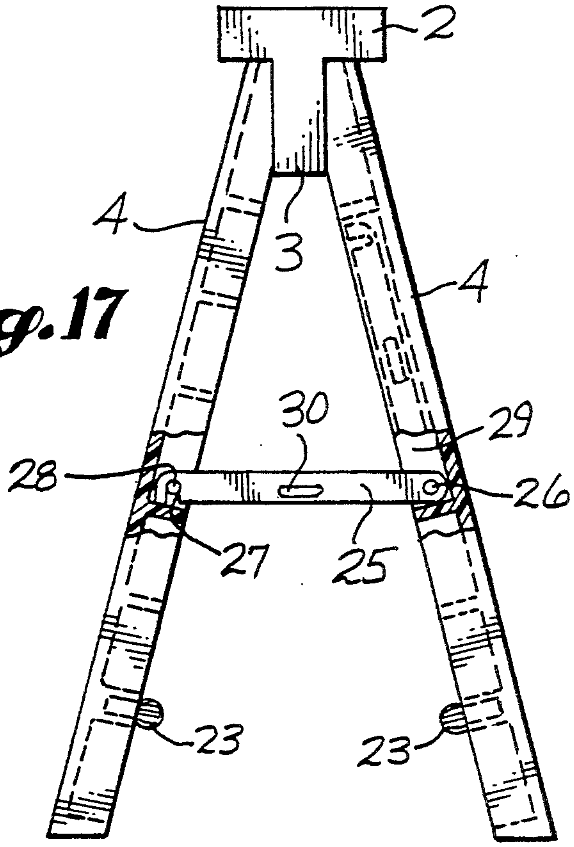
Fig. 17

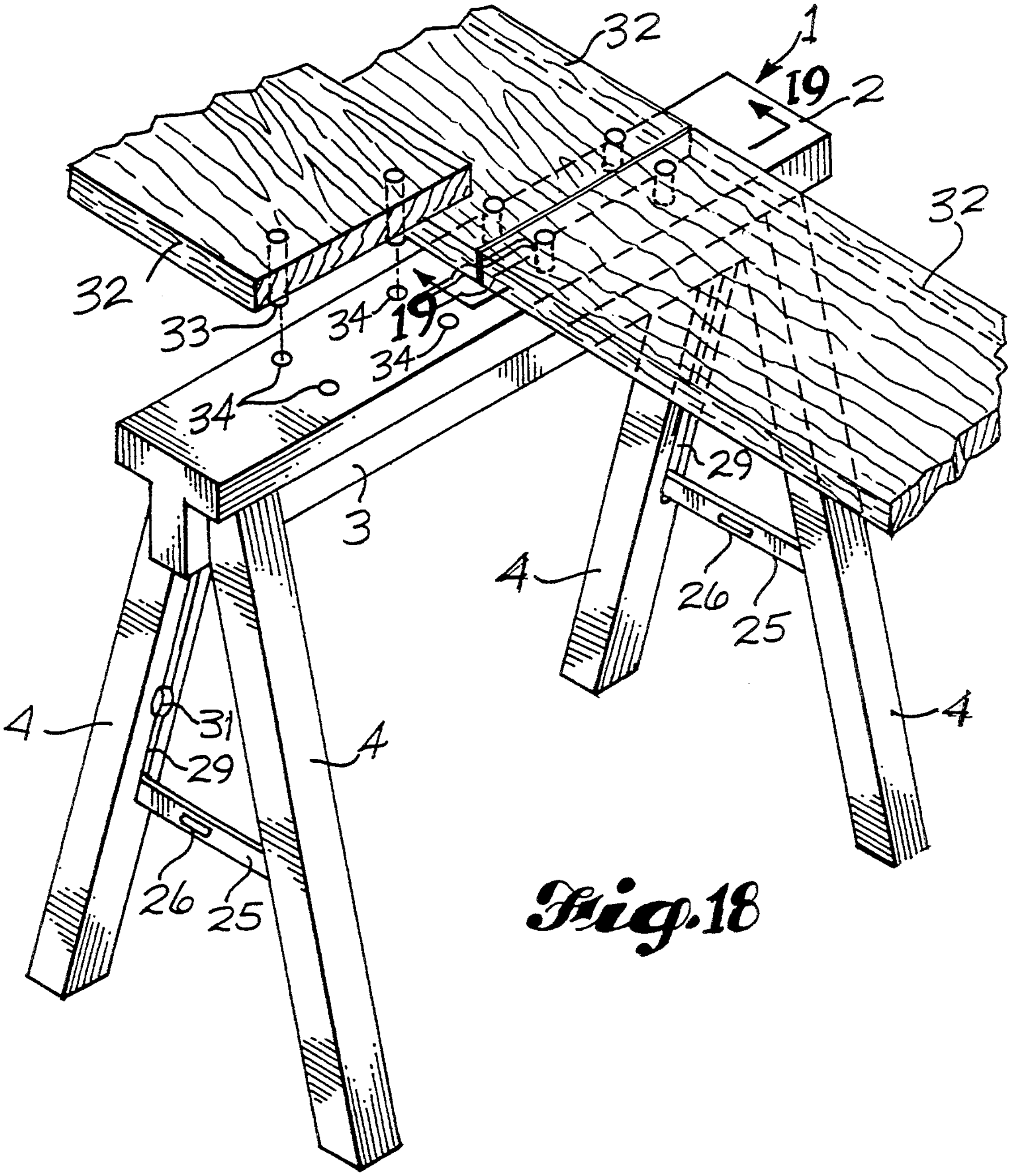
Fig. 18
Fig. 19
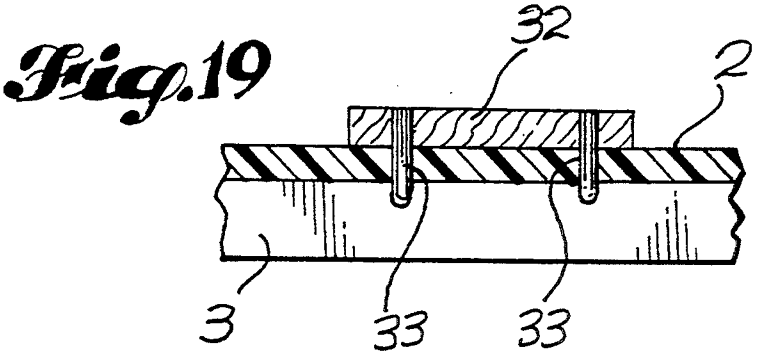

Fig. 23
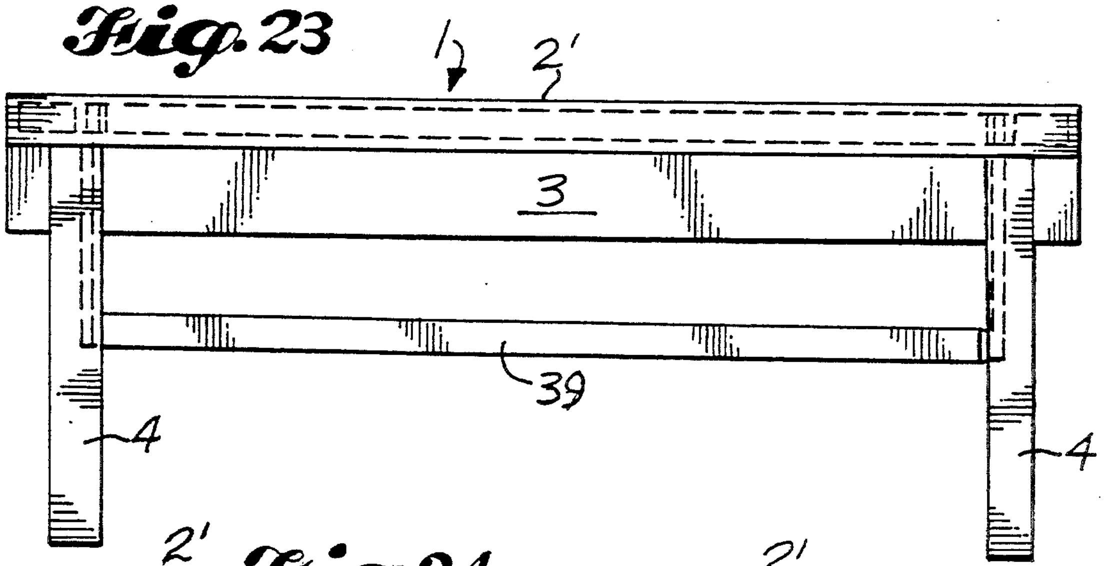
Fig. 24
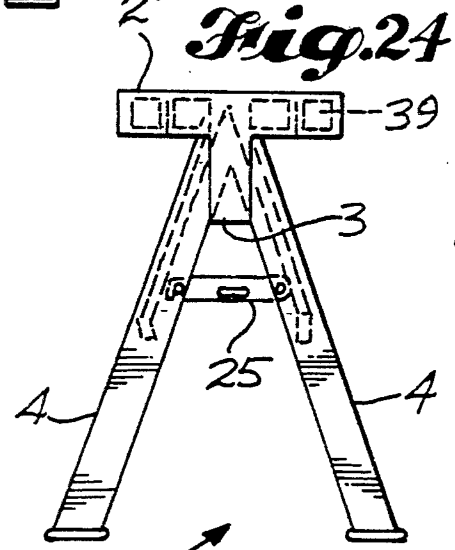
Fig. 20
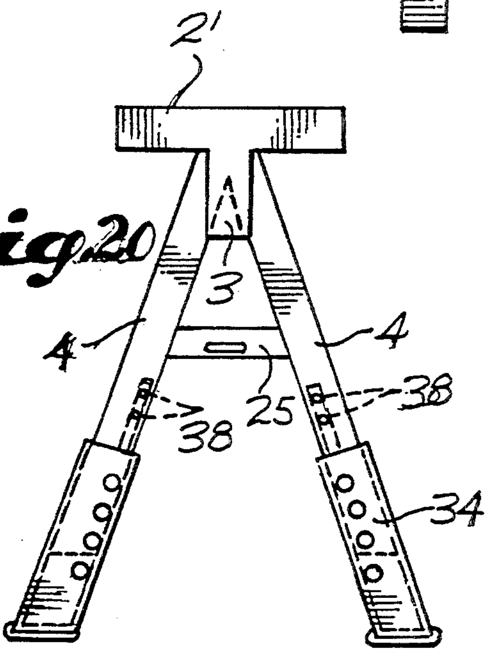
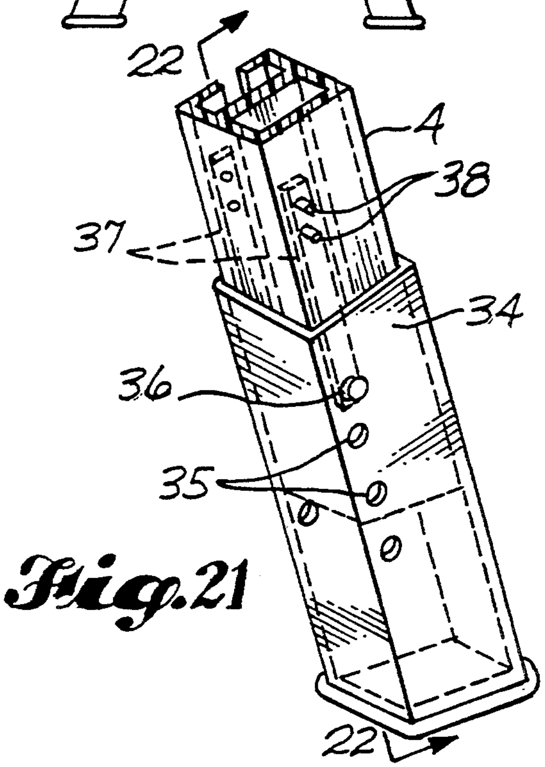
Fig. 21
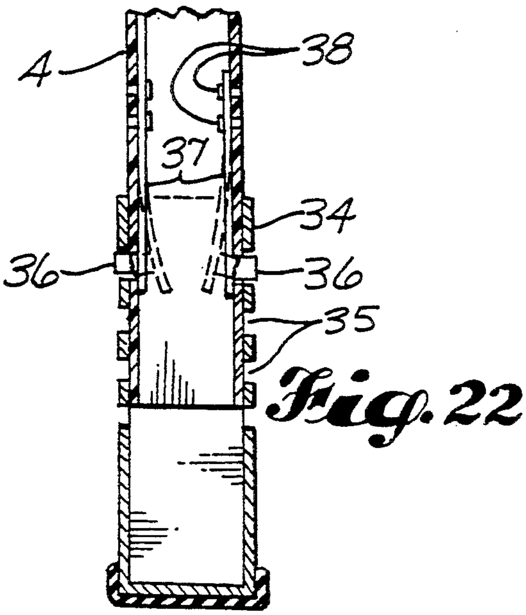
Fig. 22

Fig.25
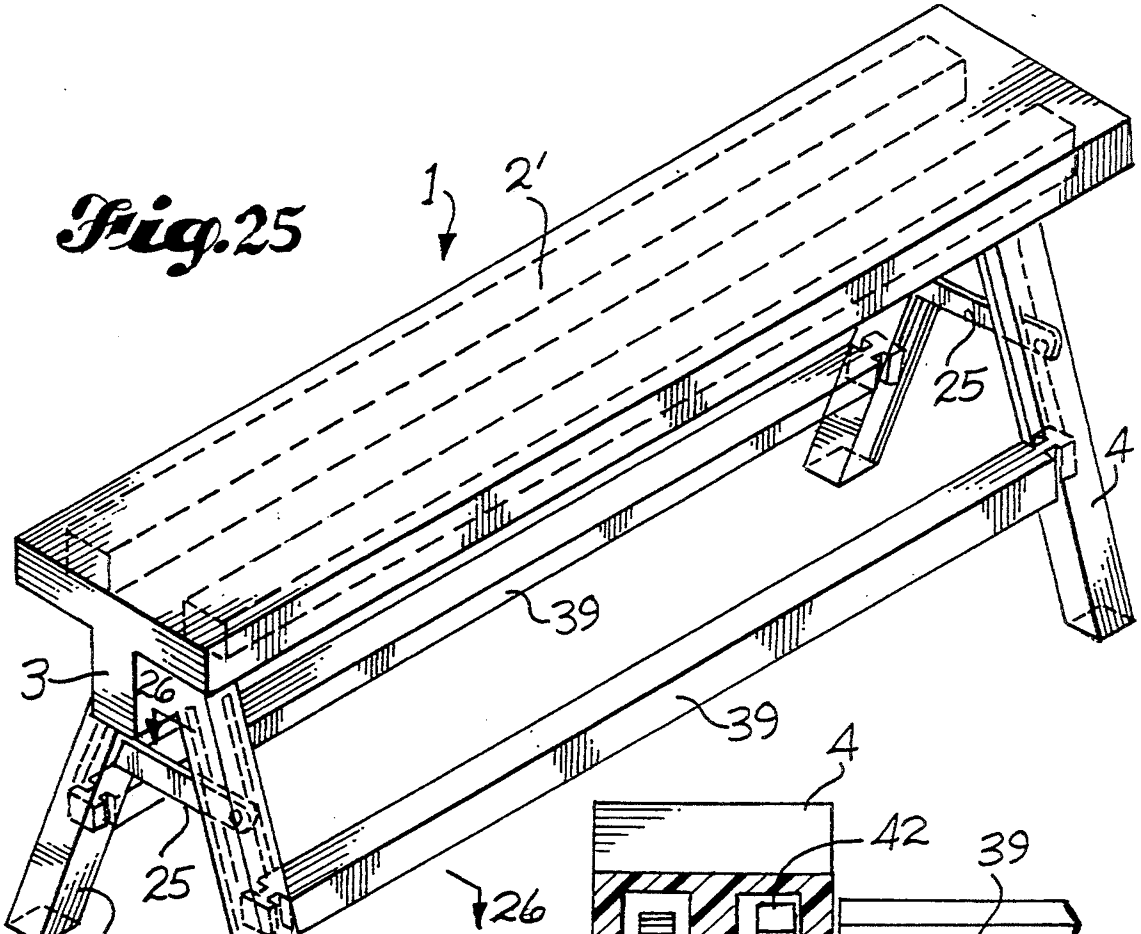
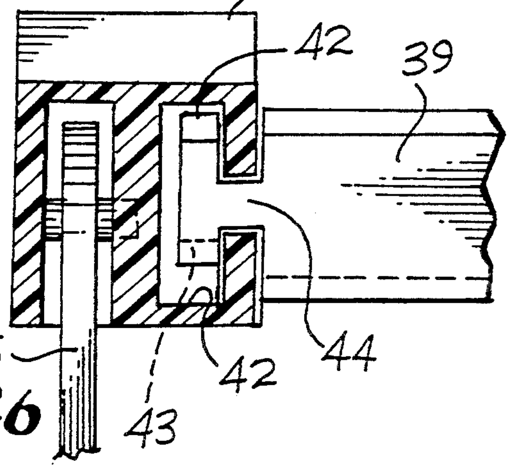
Fig.26

FOLDAWAY SPLAY-LEGGED STAND

BACKGROUND OF THE INVENTION

FIELD OF THE INVENTION

The present invention relates to foldaway splay-legged stands such as sawhorses and stands for supporting a workman for applying drywall sheets high on a wall or on a ceiling.

THE PROBLEM

The problem solved by the present invention was to devise a sawhorse or splay-legged stand of adequate height without being longer than necessary, the components of which could be folded into a compact bundle for convenient transportation and storage.

PRIOR ART

The Rossow U.S. Pat. No. 2,089,429, issued Aug. 10, 1937, shows a splay-legged saw bench, the legs of which can be swung from splayed relationship into parallel relationship, and then the pairs of legs can be swung toward each other into overlapping relationship with the connection plank or board. The difficulty with this type of construction is that either the legs must be too short to support the connecting board at a convenient working height or the length of the connecting board or plank must be longer than desirable for convenient handling or use.

De Young U.S. Pat. No. 1,960,991, issued May 29, 1934, discloses a splay-legged folding trestle. In order to provide legs of sufficient length to support the connection between the pair of legs at a desirable height without the connecting means being inconveniently long, the means connecting the two pairs of legs is formed in two pieces, each of which is shorter than a leg. Such two pieces can be connected in overlapping relationship as shown in FIG. 13. The difficulty with this type of construction is that, when folded, the trestle is composed of two bundles of components instead of a single bundle.

The Lake U.S. Pat. No. 3,716,112, issued Feb. 13, 1973, shows a collapsible sawhorse in which the legs can be folded from splayed relationship to parallel relationship, and then the legs of each pair can be swung into positions alongside the crosspiece joining the legs but, because the pivots are mounted on the crosspiece in the same plane, the legs when folded as shown in FIG. 3 cannot be folded into precise parallelism with the crosspiece but are disposed at an angle to the crosspiece so that the resulting bundle is not compact and neat.

The Chapman et al. U.S. Pat. No. 4,570,752, issued Feb. 18, 1986, shows a foldable sawhorse in which the splayed legs can be folded into parallelism and then each pair of legs can be swung relative to the crosspiece into a bundle. The disclosure of this patent is not clear, however, because in FIG. 2 the legs 7 and 13 appear to be almost as long as the crosspiece 3, whereas in FIG. 6 the legs 7 and 13 are shown as being less than one-half the length of the crosspiece 3. If the proportions of the legs and crosspiece shown in FIG. 6 are correct, then either the legs would be too short to support the crosspiece at a desirable working height or the crosspiece would be undesirably long as discussed in connection with the Rossow U.S. Pat. No. 2,089,429. If the legs were almost as long as the crosspiece as indicated in FIGS. 1 and 2, then the sawhorse could not be folded in the manner indicated in FIG. 6.

SUMMARY OF THE INVENTION

It is an object of the present invention to provide a foldaway splay-legged stand which in erected condition is very steady and strong while being light.

Another object is to provide such a stand which is very compact and neat when folded.

A further object is to provide such a stand in which all of the components are connected when folded.

An additional object is to provide a stand which can be folded from erected condition and which can be erected from folded condition quickly and easily.

The foregoing objects can be accomplished by a stand having two pairs of legs connected by a crosspiece, the legs of each pair being connected by a pin enabling the legs to be swung between splayed relationship and parallel relationship and to be swung between a position extending transversely of the crosspiece and a position in which the legs and crosspiece are folded into parallel contiguous relationship.

BRIEF DESCRIPTION OF THE DRAWINGS

FIG. 1 is a top perspective of the splay-leged stand in erected condition.

FIG. 2 is a top perspective of the splay-leged stand in folded condition.

FIG. 3 is a top perspective of the splay-leged stand in folded condition and inverted from the position shown in FIG. 2.

FIG. 4 is a fragmentary longitudinal section through the longitudinally central portion of the crosspiece showing a carrying grip in retracted position; and FIG. 5. is a similar view showing the carrying grip in extended position.

FIG. 6 is a bottom plan of the stand with three legs in folded position and one leg shown as being withdrawn from folded position.

FIG. 7 a fragmentary bottom plan of the stand with two legs in folded position and opposite legs being withdrawn from folded condition, parts being broken away.

FIG. 8 is a top perspective of the stand in inverted position with two of the legs folded, one of the other legs being slightly withdrawn from folded position and the other leg being swung from folded position toward erected position.

FIG. 14 is a top perspective of the stand in inverted position with the legs in erected condition.

FIG. 15 is a fragmentary detailed vertical section through corresponding portions of two legs with a leg-connecting brace shown in elevation.

FIG. 16 is a side elevation of the stand in erected condition.

FIG. 17 is an end elevation of the stand in erected condition, parts being broken away.

FIG. 18 is a top perspective of the stand in erected condition shown supporting the ends of scaffolding planks.

FIG. 19 is a detailed vertical section through a portion of the stand assembly shown in FIG. 18 taken on line 1913 19 of FIG. 18.

FIG. 20 is an end elevation of a stand having extension legs.

FIG. 21 is a fragmentary detail top perspective of a portion of a leg showing the extension; and FIG. 22 is a longitudinal section through. the leg taken on line 22—22 of FIG. 21. FIG. 23 is a side elevation of a stand, the sides of which have stepping bars; and FIG. 24 is an end elevation of such stand.

FIG. 25 is a top perspective of the stand shown in FIGS. 23 and 24.

FIG. 26 is a cross section through a stand leg taken on line 26—26 of FIG. 25.

DETAILED DESCRIPTION

Figure 9:
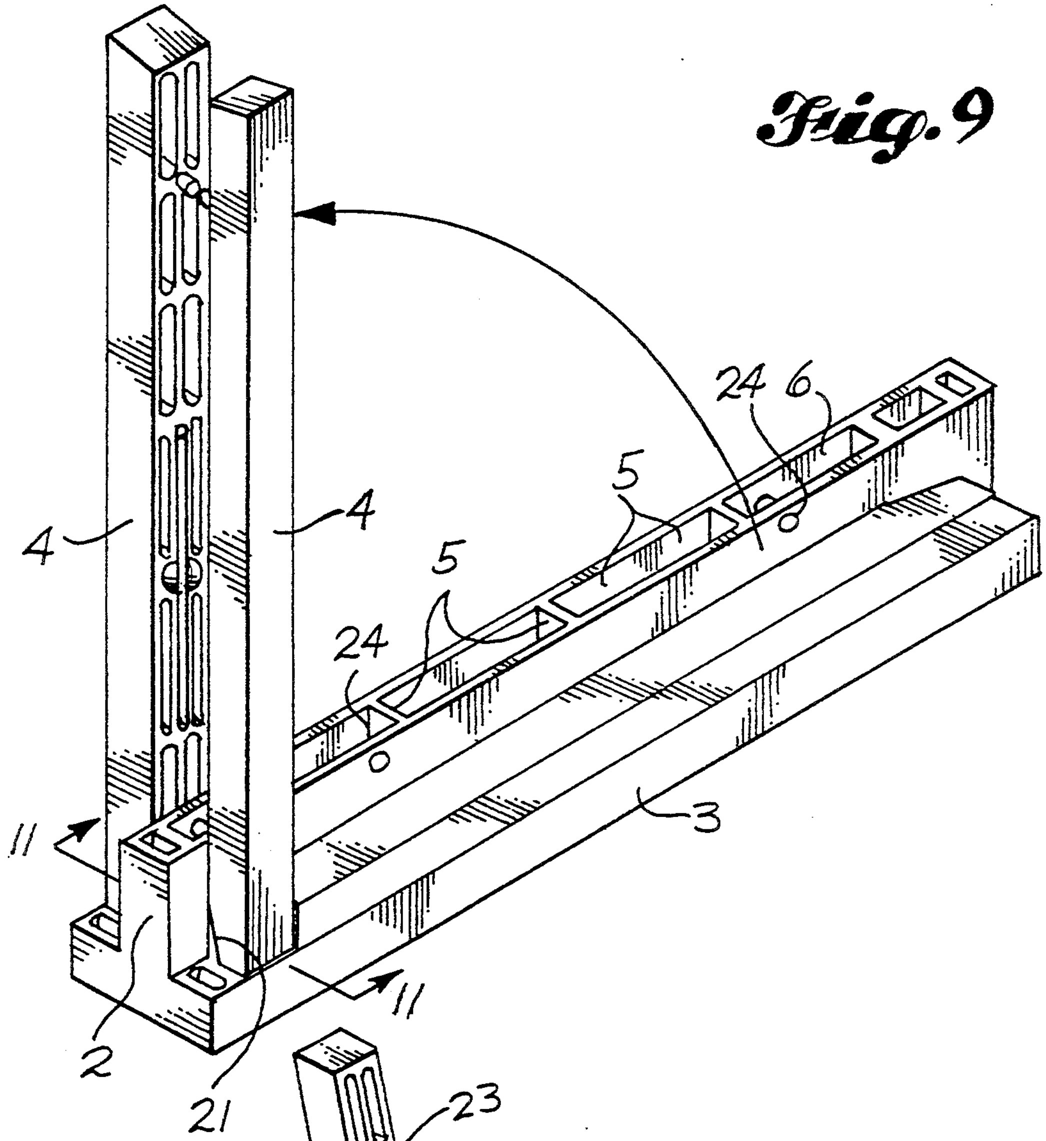
FIG. 9 is a top perspective of the stand in inverted position similar to FIG. 8 but showing two legs as having been swung from folded position toward erected position.

In one form, the foldaway splay-legged stand may be a sawhorse which is shown in FIGS. 1 to 19 inclusive, Such sawhorse includes a crosspiece 1 in the form of a T-bar including a cap 2 and a central flange 3 projecting downward from such cap. The crosspiece 1 extends between pairs of supporting legs 4 located adjacent to opposite ends of the crosspiece 1, respectively, the legs of which pairs are disposed in splayed relationship when the sawhorse is erected as shown in FIGS. 1, 14, 16, 17 and 18. Thus, when the sawhorse is erected, the upper ends of the legs of each pair support the opposite end portions of the crosspiece, respectively, and the legs of each pair diverge downwardly from their upper ends.

It is preferred that the entire sawhorse be made of molded plastic such as of polyvinyl chloride (PVC), delrin or other economical strong plastic in order to make the structure light while having adequate strength. It is preferred that each component be formed of essentially channel-shaped shell structure in which the channel cavity has closed ends and the side flanges of the channel are stiffened by transverse webs or partitions and, if desired, also a longitudinal web or partition. Thus, as shown in FIGS. 3, 6 to 10 inclusive, and 14, the crosspiece i has transverse webs 5 defining cavities 6 between them. Similarly, as shown in FIGS. 1 and 7 to 12, inclusive, the legs 4 have transverse webs or partitions and a longitudinal web or partition 5 defining cavities 6 between them. The crosspiece and legs are molded, however, so as to provide end walls closing the ends of these components.

When the stand is in folded condition, it may be transported readily by a grip or handle 7 normally recessed in the cap 2 of the crosspiece 1, as shown in FIGS. 1, 2 and 4, but capable of being withdrawn from its retracted position into the carrying position shown in FIG. 5. Preferably the grip has grooves 8 in its opposite sides and slots 9 opening at the ends of the U-shaped grip as shown in FIGS. 4 and 5. The end slots 9 may be crossed slots to provide four somewhat resilient fingers that can be pressed inward to enable barbs 10 on such fingers to be pressed through apertures 11 in the bottom of the grip-receiving recess 12 in the cap 2 of the crosspiece 1 as shown in FIGS. 4 and 5.

The ends of the grip 7 are tapered so that, when they are pressed against the apertures 11, the fingers formed by the crossed slots 9 will be pressed inward to enable the barbs 10 to move through the apertures. The fingers are sufficiently resilient so that, when the barbs 10 have passed through the apertures, the fingers will straighten to move the barbs 10 outward for locking engagement with the inner peripheries of the apertures 11. Such disposition of the barbs will both prevent withdrawal of the grip ends outward through the apertures 11 and enable the inner peripheries of such apertures to bear on the barbs when the grip is in the extended position of FIG. 5 so that the weight of the folded assembly will be transmitted through the barbs to the grip 7 when the stand is being carried.

As shown in FIG. 4, the recess 12 is sufficiently deep to enable the grip 7 to be retracted completely within it. In order to enable the grip to be grasped for pulling it from the retracted position of FIG. 4 into the carrying position of FIG. 5, finger access recesses 13 are provided in opposite sides of the grip-receiving recess 12 to enable fingers to be inserted alongside the grip into the grooves 8 when it is in the retracted position of FIG. 4.

Figure 10:
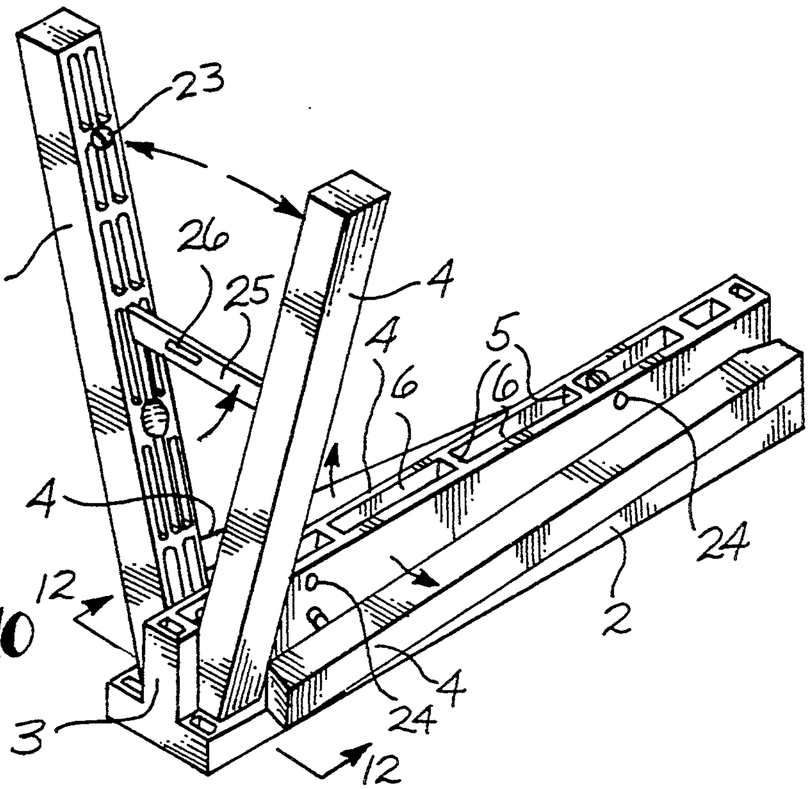
FIG. 10 is a top perspective of the stand in inverted position similar to FIGS. 8 and 9 but showing two legs folded and the other two legs in erected position.
Figure 11:
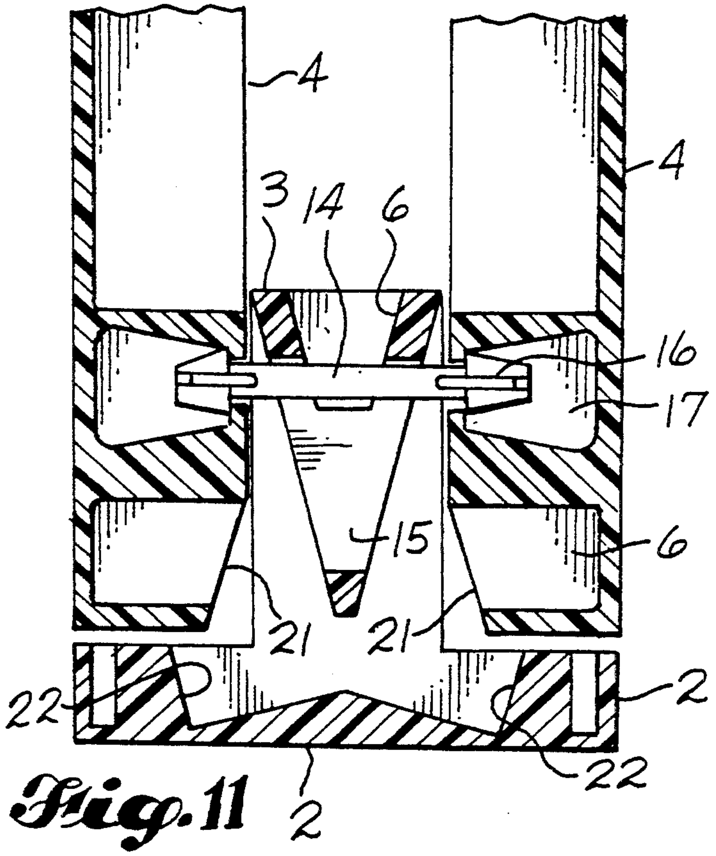
FIGS. 11 is an enlarged detailed section through the crosspiece and a portion of two legs taken on lines 11—11 of FIG. 9.

As shown in FIG. 11, a pin 14 for connecting the upper ends of the two legs of a pair integrally to the crosspiece extends through an aperture in the flange 3 of the crosspiece 1 in the form of a closed-end slot 15 elongated transversely of the length of the crosspiece. Such pin establishes the location of the respective pair of legs 4 lengthwise of the crosspiece 1 in its end portion. On each end of connecting pin 14 is a head 16 that is received loosely in a cavity 17 in the end of a leg. Such cavity is of sufficient size so that the legs of each pair can be tilted to a substantial degree from positions in which the legs are parallel as shown in FIGS. 9 and 11 into positions diverging from the crosspiece as shown in FIGS. 10 and 12.

Figure 13:
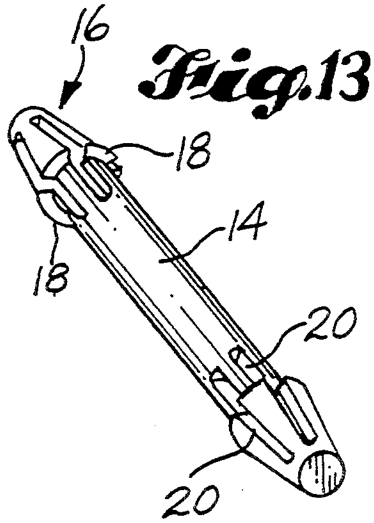
FIG. 13 is a top perspective of a pin for interconnecting the crosspiece and the legs of one pair.

As shown in FIG. 13, each head 16 of the pin 14 has an enlargement forming shoulders 18 constituting barbs. In order for each pin head to be inserted into a cavity 17 through its access opening 19, which cavity is closed except for such access opening, the pin shank must be made sufficiently radially contractible so that the shoulder portions of the pin can contract to pass through the opening 19 forming the entrance to the leg cavity 17 in which the pin head 16 is to be lodged. The pin shank is made radially contractible by providing through the shank crossed slots 20 extending substantially equal distances lengthwise of the pin to opposite sides of the shoulders 18. Both ends of such slots preferably are closed but one end of each slot could be open at the end of the pin.

Mounting the pins 14 in slots 15 will enable the legs to be moved lengthwise toward and away from the crosspiece 1. Preferably the end portions of the inner sides of the legs 4 have bevels 21 so that the legs can be swung from the parallel positions of FIGS. 9 and 11 into positions having greater divergence as shown in FIGS. 10 and 12 without increasing the length of the connecting pin 14 or reducing too greatly the thickness of the central flange 3 of the crosspiece.

Figure 12:
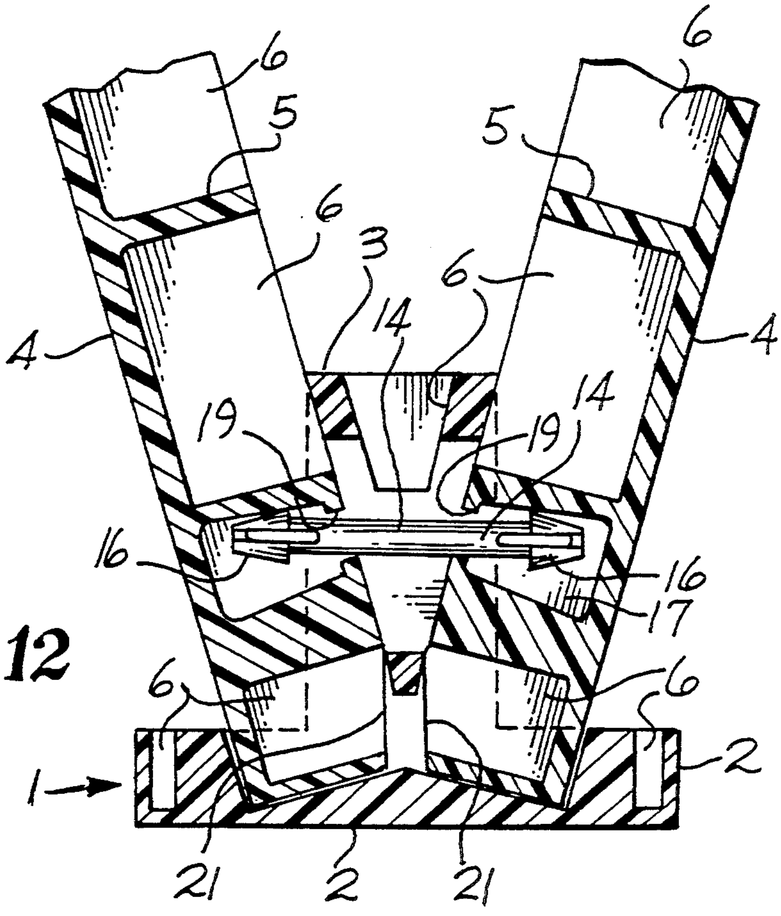
FIG. 12 is an enlarged detailed selection through the crosspiece and portions of two legs taken on line 12—12 of FIG. 10.

At the location of the legs 4 of each pair, the crosspiece flange 3 has in it grooves of a width to receive the width of a leg 4, and the bottoms of which grooves flare downwardly to engage the legs when they are in downwardly divergent or splayed relationship as shown in FIG. 12. At such location the underside of the cap 2 is recessed to form a downwardly opening socket 22 for receiving the upper end of a leg by lengthwise movement of the leg from the position shown in FIG. 11 to the position shown in FIG. 12. In order to move a leg lengthwise in this fashion, it is necessary for the leg not only to be moved lengthwise but also to be canted to provide the splayed relationship of the legs of the pair and to enable the upper end portion of each leg to enter the socket 22 into abutment with the underside of the cap 2 as shown in FIG. 12.

In moving each leg 4 lengthwise from the position shown in FIG. 11 to the position shown in FIG. 12, it will be necessary to move both legs of each pair lengthwise conjointly since they are connected by the connecting pin 14, as described above. In order to withdraw the leg ends from the sockets 22, the legs must be moved lengthwise in splayed relationship sufficiently to clear the sockets 22 in the crosspiece cap 2, and then the legs can be swung toward each other into parallelism as shown in FIGS. 9 and 11. The length of the slot 15 is at least as great as the depth of the sockets 22 to enable the upper end portions of the legs to be moved into and out of such sockets.

When the upper ends of the legs 4 have been withdrawn from the sockets 22 and the legs of the pair have been swung into parallelism as shown in FIGS. 9 and 11, the legs of such pair can be swung individually or conjointly about the axis of pin 14 from a position extending transversely of the crosspiece 1 as shown in FIG. 9 into a position parallel to the crosspiece 1 as shown in FIGS. 3, 6 and 8.

There is sufficient play between the heads 16 of the pins 14 so that, when the legs have been swung into positions alongside the crosspiece 1, the swinging ends of the legs can be moved to a limited extent toward and away from the crosspiece flange 3. A catch pin 23 projecting from the inner side of each leg near its swinging end can engage in a socket 24 in the flange 3. The head of such pin is of mushroom shape and slotted so that its end can be contracted radially to some extent to be lodged in the socket 24. The pin head will resiliently grip such socket so as to hold the leg in contiguous engagement with the side of the crosspiece flange 3 until it is intentionally pulled away from such nested position preparatory to being swung into a position with its length extending transversely of the crosspiece as shown in FIGS. 8 and 9 in the process of erecting the stand.

In folding the stand from the erected condition of FIG. 14 to the folded condition of FIGS. 2 and 3 with the legs nested in the angle between the crosspiece cap and flange, the legs of the two pairs are not folded simultaneously into positions parallel to the crosspiece, but the folding of such leg pairs is effected sequentially so that, in their final folded condition shown in FIGS. 2 and 3, the legs of the two pairs are stacked as shown in FIGS. 2, 3 and 8. The first pair of legs to be folded will be folded not only against the opposite sides of the crosspiece flange 3 but also against the underside of the cap 2.

In folding the second pair of legs, the pin 14 connecting such legs will be shifted to the position shown in FIG. 11 so that the legs connected by such pin are spaced from the underside of the crosspiece cap 2 a distance at least as great as the thickness of the legs 4 first folded into nested relationship. The second pair of legs to be folded will therefore fold over the legs first folded to be disposed in parallel contiguous relationship both to the cap 2 and flange 3 of the crosspiece 1 and also to the adjacent sides of the legs first folded. Either pair of legs may be folded first, and the other pair of legs may be folded thereafter. The result of such folding will be that the legs and crosspiece will all be disposed in parallel contiguous relationship as shown in FIGS. 2 and 3.

When the stand has been erected to the condition of FIGS. 1, 14, 16 and 17, the stand can be secured in such erected condition by holding the legs 4 of each pair in splayed relationship. Securing the legs of each pair in such relationship is effected by the insertion of the upper leg end portions into the crosspiece sockets 22 as shown in FIG. 12 and by connecting them with a brace strap 25 at a location spaced a substantial distance from the crosspiece 1. Such brace strap is mounted on one leg by a pivot 26, and the swinging end of the brace strap has in it a notch 27 engageable with a crosspin 28 in a cavity of the other leg of the pair. When the brace strap is in the leg-connecting position shown in FIG. 15, the legs of the pair will be held in the proper splayed relationship so that they cannot be moved lengthwise to withdraw their upper ends from the socketed positions shown in FIG. 12.

When the stand is to be folded, each brace 25 will be swung from the solid-line position shown in FIG. 15 through the broken-line position retracted into a recess 29 in the leg 4 to which the brace is connected by pivot 26. In order to withdraw the brace subsequently, finger grip depressions 30 in opposite sides of the brace can be grasped to swing the brace out of its retracted position. Clearance notches 31 are provided in opposite sides of the leg recess 29 to afford access for fingers alongside the brace strap 25 for engagement with the fingergrip depressions 30.

The stand can be used to support ends of scaffolding planks 32, if desired, as shown in FIG. 18. The ends of such planks can be securely retained on the caps 2 of the stands by providing pins 33 projecting from the undersides of the plank ends. These pins will be located for engagement in sockets 34 in the cap 2 of the stand, as shown in FIG. 19.

If it should be desirable to alter the elevation of the crosspiece I of the stand, leg extensions can be provided as shown in FIGS. 20, 21 and 22. The leg extensions 34 are of square tubular shape of a size to slide telescopically over the lower ends of the legs 4 of the stand as shown best in FIGS. 21 and 22. To enable each leg extension to be adjusted lengthwise of the leg 4 over which it is slid, the tubular extension may have in it a series of apertures 35 spaced lengthwise of the extension for receiving selectively a latch pin 36 extending through an aperture in the leg and carried by a spring leaf 37. The end of such spring leaf remote from the latch pin 36 is secured to the wall of the leg 4 by rivets 38.

To adjust the position of the extension 34 lengthwise of the leg, the pins 36 can be pushed inward to the broken-line positions shown in FIG. 22 for releasing each latch pin 36 from an aperture 35 so that the extension can be slid along the leg until the latch pins engage the next apertures 35 or other apertures 35. By the same manipulation of latch pins 36, the leg extension can be released so that it can be removed from the leg.

Conveniently, the adjacent latch apertures are spaced apart at two-inch intervals, so that the height of the stand can be adjusted in increments of two inches by engaging the latch pins 36 in different latch apertures 35, although a different spacing of the latch apertures 35 could be utilized if desired. Also it may be desirable to utilize a crosspiece 1 having a wider cap than used for the sawhorse shown in FIGS. 1 to 18. The cap 2 of the sawhorse may, for example, be six inches in width, and the depth of the flange 3 may be four inches.

Figure 27:
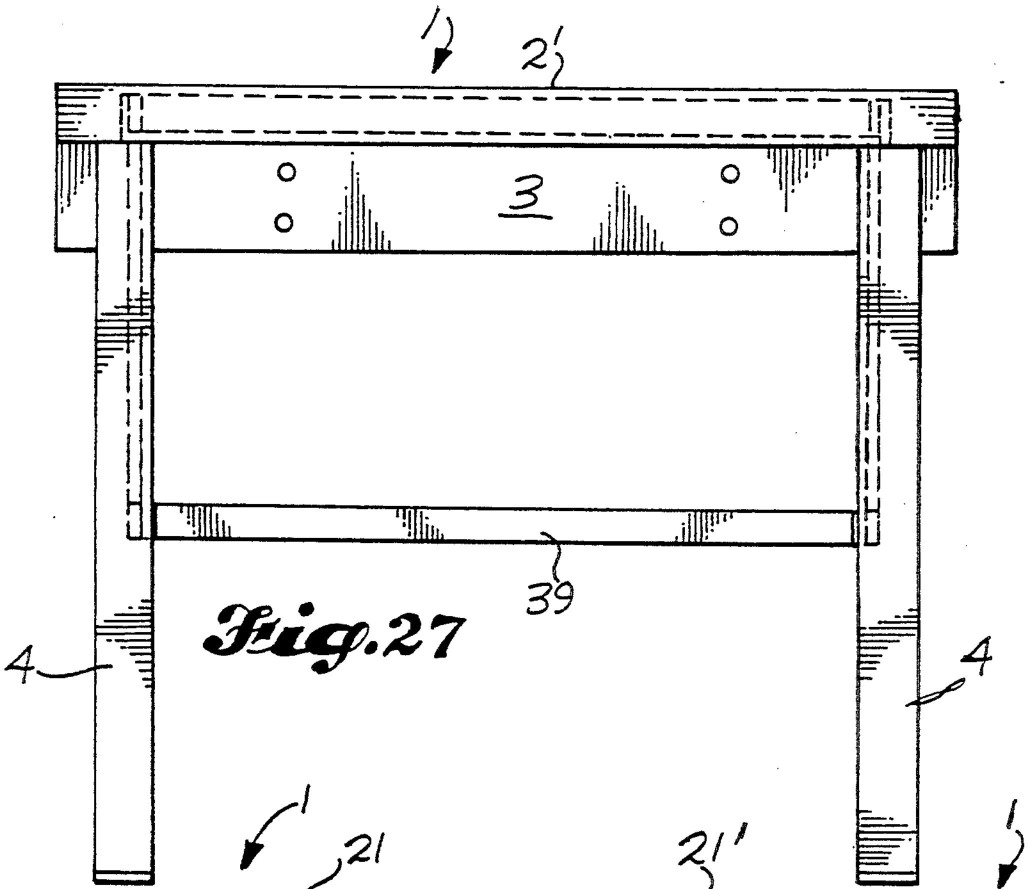
FIG. 27 is a side elevation of a stand similar to the stand of FIG. 23 but having different proportions.
Figure 28:
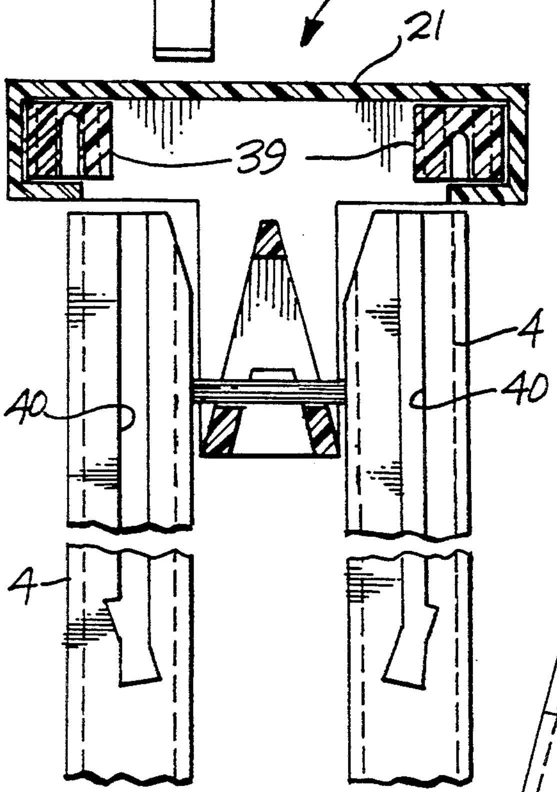
FIG. 28 is a transverse vertical section through the stand of FIG. 27 showing parts in one position.
Figure 29:
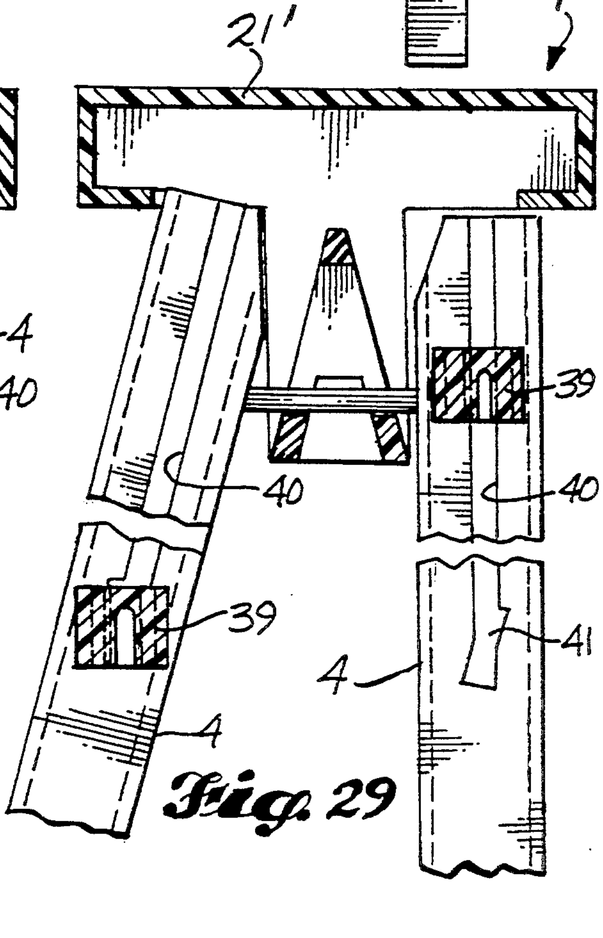
FIG. 29 is a similar transverse vertical section showing parts in different positions.
Figure 30:
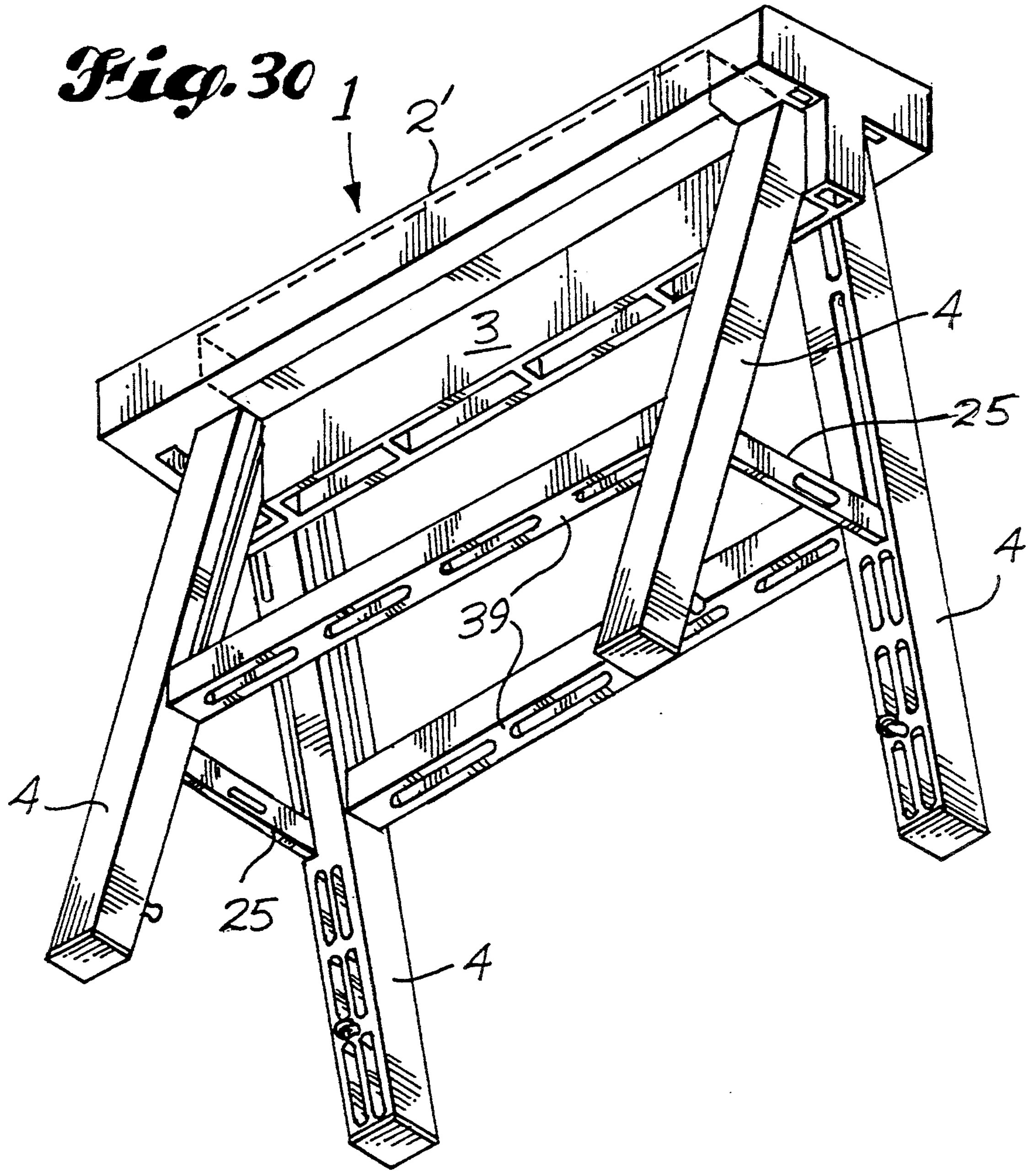
FIG. 30 is a bottom perspective of the stand shown in FIG. 27.

In FIGS. 23 to 30, stands are shown having the same general construction as the sawhorse described in connection with FIGS. 1 to 17. In this instance, however, the stand is particularly useful for a worker to stand on in placing drywall sheets on the upper portion of a wall or on a ceiling. The stand may, for example, be eighteen to twenty-four inches high, and the cap 2' of the crosspiece 1 may be ten inches wide to provide more stable footing. The crosspiece of the stand shown in FIGS. 27 and 30 is shorter than the crosspiece of the stand shown in FIG. 23, but the general construction of the stands is otherwise similar.

If the stands of FIGS. 23 to 30 is eighteen to thirty inches high, it is too high for a worker to step from the floor onto the top of the crosspiece cap 2' conveniently. For such use, therefore, a step 39 can be provided for each side of the stand. FIGS. 23, 24 and 25 show a step as having been attached to each side of the stand. If the stand is eighteen inches in height, the rise between the floor and the top of the step could be nine inches and the rise between the top of the step and the top of the cap 2' could be nine inches. If the stand height were twenty-four inches, the height of each rise could be twelve inches and, if the height of the stand were thirty inches, each rise could be fifteen inches.

As shown best in FIGS. 21, 28 and 29, each leg 4 of one pair has a slot 40 in its side facing the other pair of legs, and the bottom of each slot has an angular portion 41. At one location the slot 41 has a wide portion 42, preferably of a width as great as the width of the inner slot 41. Each slot 40 communicates with an interior cavity or slot 42 that has a transverse width considerably greater than the width of the slot 40, 41.

Each step 39 has a head 43 connected to the step by a neck 44 to form a T-head. The width of the head is greater than the width of the slot 40, 41 but is less than the width of the leg cavity 42. The thickness of the neck 44 is slightly less than the width of the slot 41, 42. The depth of the head and the neck preferably is the same as the depth of the step 39.

The head 2' of the crosspiece 1 is hollow to provide recesses at its opposite sides for reception of the steps 39 as shown in FIG. 28 and in phantom in FIGS. 23, 25, 27 and 30. The steps will occupy their stored positions of FIG. 28 when the legs are folded in the nested relationship shown in FIG. 3 and even when the legs are unfolded to their parallel positions of FIGS. 9 and 11.

If steps are provided, the procedure for erecting the stand is different from that illustrated in FIGS. 9 and 10. Where steps are provided, instead of both legs at one end of the stand being unfolded, splayed and set in the sockets of the crosspiece as shown in the transition from FIG. 9 to FIG. 10, the two legs on the same side of the stand are erected first. While both sets of legs could be moved into the parallel position shown in FIG. 28, the corresponding legs on one side of the stand at least should be unfolded and then, before the legs are swung outward, a step 39 should be moved from its stored position toward the center of the cap 2' until the neck 44 can be inserted into the upper end of the slot 40 in the corresponding leg, and then the step is slid downward to the bottom of slot 40 and into the slot section 41. The step is then cocked so that the necks 44 enter the slot portions 41 so that the step top and bottom are at angles to the leg corresponding to the angle of the leg relative to vertical when the legs are in the splayed relationship shown in FIG. 10. A step 39 is shown as having its neck lodged in the slot portion 41 at the right of FIG. 29.

The corresponding legs of the pair thus connected by the step 39 can then be swung outward and moved lengthwise to insert their corresponding ends into the sockets 22 in the crosspiece 1.

A step 39 is shown as being slid along a leg at the right of FIG. 29. This step also will be moved downward until its necks are lodged in the inclined sections 41 of the slots 40 before the legs 4 are swung outward and the legs moved lengthwise to insert their ends adjacent to the crosspiece into the sockets 22 of the crosspiece.

To fold the stand, the reverse procedure is followed. A crosspiece is turned from the position shown at the left of FIG. 29 so that its necks 44 will be aligned with slots 40. The step is then raised into the crosspiece and moved into a pocket at the side of the crosspiece. The legs 4, no longer connected by the step 39, can then be swung inward to the positions shown in FIG. 28, and then the legs of the opposite pairs can be swung toward each other into stored position.

The opposite ends of a step 39 can be attached to the legs 4 on one side of the stand by inserting the heads 44 at opposite ends of the step through the apertures 42 in the spaced legs into the upper portions of the slots 40 and then sliding the step downward until the necks 45 bottom on the lower ends of the slots 41, and the heads 44 bottom on the lower ends of the slots 40. Each head 44, neck 45 and projection 43 should have a relatively close sliding fit with the leg slot 40, the leg slot 41 and the outer face of the leg 4, respectively, so that, when the head 44 is engaged in the leg slot 40, the step 39 cannot be twisted appreciably relative to the leg.

Each step 39 should be of downwardly-opening channel shell construction reinforced by webs similar to the structure of the legs and crosspiece of the sawhorse described in connection with FIGS. 1 to 15 as shown in FIG. 30. The steps will therefore be light but strong. When attached to the legs of the stand in the manner described above, they will serve as spreaders for stiffening the legs of the stand.

I claim:

1. In a foldable splay-legged stand including a crosspiece and pairs of legs adjacent to opposite ends of the crosspiece, respectively, the improvement comprising the crosspiece having a slot elongated transversely of the length of the crosspiece, a pivot pin extending transversely of the length of the crosspiece and through said slot, connecting the legs at opposite sides of the crosspiece and being slidable lengthwise of said slot and enabling the legs to be swung into parallel relation to the crosspiece, each leg having a catch pin spaced a substantial distance lengthwise of the leg from its pivot pin, and the crosspiece having a socket complemental to said catch pin and located to receive said catch pin when the leg is swung into parallelism with the crosspiece to hold the leg in folded relationship to the crosspiece.

2. In a foldable splay-legged stand including a crosspiece and pairs of legs spaced lengthwise of the crosspiece, the improvement comprising the crosspiece having an aperture, a pivot pin extending transversely of the length of the crosspiece and through said aperture, connecting the legs at opposite sides of the crosspiece and enabling the legs to be swung into parallel relation to the crosspiece, each leg having a catch pin spaced a substantial distance lengthwise of the leg from its pivot pin, and the crosspiece having a socket complemental to said catch pin and located to receive said catch pin when the leg is swung into parallelism with the crosspiece to hold the leg in folded relationship to the crosspiece.

3. In a splay-legged stand having a crosspiece and two pairs of legs extending in splayed relationship from the crosspiece for supporting it, the improvement comprising a step connecting corresponding legs of the leg pairs, each leg having an aperture in its side facing the other corresponding leg and located adjacent to the crosspiece, said step having a T-head near each end of a size to pass through such an aperture and each leg having a slot for receiving the neck of a step T-head to prevent separation of the step end and its adjacent leg and said slot extending from said aperture in the leg a substantial distance down the leg for sliding of said step from said aperture down the leg to a desired location spaced from the crosspiece.

4. In a foldable splay-legged stand including crosspiece means and pairs of leg means spaced lengthwise of the crosspiece means, respectively, the crosspiece means having downwardly-opening sockets for receiving the upper end portions of the leg means, an aperture in one of the means elongated transversely of the length of the crosspiece means and located adjacent to each pair of leg means and a pin extending transversely of the length of the crosspiece means and through each aperture, connecting the leg means of each respective pair at opposite sides of the crosspiece means and being slidable lengthwise of the aperture for movement of each leg means lengthwise to fit their upper end portions into the sockets of the crosspiece means in abutment with the crosspiece means such when leg means are in downwardly divergent relationship, the improvement comprising the leg means of each pair having sockets receiving the ends of their connecting pin sufficiently loosely for enabling the leg means of such pair to be tilted relative to their connecting pin from downwardly divergent relationship into parallelism with each other when the upper end portions of such legs are withdrawn from the crosspiece sockets, each aperture being an elongated closed-end slot located and being of a length to enable the leg means to be moved lengthwise a distance sufficient to withdraw the upper end portions of the leg means out of the downwardly opening sockets of the crosspiece means while the pin and slot interconnect the leg means and the crosspiece means inseparably, and the pins and apertures guiding the leg means and the crosspiece means for relative swinging to fold the leg means in coextensive relationship alongside the crosspiece means extending in the same direction from their connecting pin while maintaining the leg means and crosspiece means interconnected inseparably.

5. The stand defined in claim 4, in which the crosspiece means at the location of a leg means pair is of T-bar cross section, including a cap and a central longitudinal flange projecting from the cap, the improvement further comprising the central longitudinal flange of the crosspiece means flaring away from the cap for engagement by the upper end portions of the leg means when the leg means are in divergent condition.

* * * * *

UNITED STATES PATENT AND TRADEMARK OFFICE

CERTIFICATE OF CORRECTION

PATENT NO. : 5,439,073

DATED : August 8, 1995

INVENTOR(S) : Richard Johnson

It is certified that error appears in the above-identified patent and that said Letters Patent is hereby corrected as shown below:

Claim 4: column 10, line 8, cancel "such when" and insert --when such--.

Signed and Sealed this

Thirteenth Day of February, 1996

Attest:

Bruce Lehman

BRUCE LEHMAN

*Attesting Officer* *Commissioner of Patents and Trademarks*